May 14, 1963 J. W. FITCHIE 3,089,306
LIMITATION OF THERMAL SHOCK IN ENGINE COMPONENTS
Filed Dec. 10, 1959 3 Sheets-Sheet 1

JOHN WILLIAM FITCHIE
Inventor
By Cushman, Darby
& Cushman
Attorneys

United States Patent Office 3,089,306
Patented May 14, 1963

3,089,306
LIMITATION OF THERMAL SHOCK IN ENGINE COMPONENTS
John William Fitchie, Church Crookham, England, assignor to Power Jets (Research and Development) Limited, London, England, a British company
Filed Dec. 10, 1959, Ser. No. 858,760
Claims priority, application Great Britain Dec. 11, 1958
2 Claims. (Cl. 60—39.09)

This invention relates to the reduction of thermal shock in combustion engine components liable to be subjected to sudden temperature variations as a result of rapid fluctuations in the rate of engine fuel supply.

For example, in gas turbine engines which are operated at elevated temperatures, it is known that turbine blades and other components subjected to high temperatures are apt to fail due to thermal shock if the temperature of the hot working fluid is suddenly changed so that there is a substantial temperature difference between the interior of the component and its outer surface which is directly exposed to the hot fluid. In a gas turbine, such changes in the temperature of the hot working fluid are occasioned directly by variations in the rate of fuel supply to the gas turbine combusion chamber, such variations being usually under the control of the engine operator to effect a control of engine speed. Additionally, however, variations in the rate of fuel supply may be under the control of an automatic control system for governing engine operation in accordance with some engine variable or operating condition.

It is an object of the present invention to provide a method of reducing thermal shock which may arise as a result of variations of the rate of fuel supply brought about by the engine operator.

It has been considered hitherto that the worst thermal shock condition which can occur in an engine is brought about when the components are heated suddenly as in periods of engine acceleration. Contrary to this, it has now been found that in fact the worst shock is experienced by the components on a sudden cooling as in engine deceleration.

According to the present invention, a method of limiting thermal shock in engine components subjected to temperature variations due to reduction in fuel supply to the engine comprises the step of reducing the rate at which the engine component is cooled consequent upon a sudden reduction of the rate of fuel supply by imposing a limit upon the rate of reduction of fuel supply such as will maintain thermal shock stresses within acceptable limits.

The invention also provides an engine control system comprising a control member operable to vary the rate of fuel supply to the engine and a deceleration control associated with the control member and operable in response to a sudden movement of the control member in a sense to reduce the rate of fuel supply to impose a limit on the rate of reduction of fuel supply such as will maintain thermal shock stresses in the engine components within acceptable limits. The control member may be a manually operated throttle lever.

One embodiment of the invention will now be described by way of example with reference to the accompanying drawings, of which:

Figure 1:
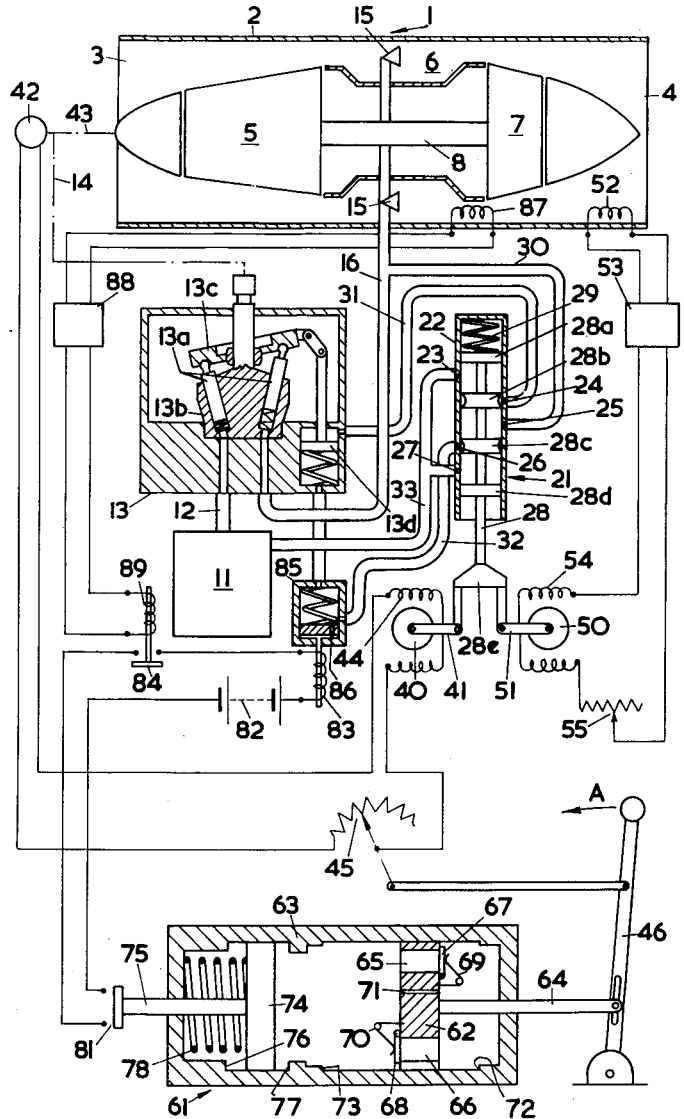
FIGURE 1 is a schematic view of a control system for an aircraft gas turbine jet propulsion engine.

Referring to FIGURE 1 there is shown an axial flow gas turbine jet propulsion engine 1 having an outer cylindrical casing 2 with an inlet 3 for air at one end and a propulsion nozzle 4 at the other. Within the casing 1 is mounted an axial flow compressor 5, a combustion system 6 and an axial flow gas turbine 7, which is mounted on a shaft 8 in common with the compressor 5.

Fuel for combustion in the combustion system is contained in a fuel tank 11 which is connected by a conduit 12 to a reciprocating fuel pump 13 which is driven by the engine as indicated schematically at 14. The pump has its delivery side connected to the fuel injectors 15 of the combustion system by conduit 16.

In operation of the engine, air drawn through the inlet 3 into the compressor 5 is compressed and after compression is discharged into the combustion system 6. Fuel from the tank 11 is drawn through conduit 12 by the pump 13 and delivered under pressure through conduit 16 into the combustion system 6. Combustion gases from this system are discharged through the turbine 7, which is thereby driven and drives the compressor 5 through shaft 8. Effluent gases from the turbine 7 pass through the nozzle 4 as a propulsive jet.

In order to control the rate of fuel supply to the engine the fuel pump 13 is of the known variable-stroke type comprising a number of reciprocating plungers 13a mounted in a rotor 13b, the stroke of the pump being varied by controlled movement of a pivoted swash plate 13c. The angle of the swash plate 13c is adjustable under the control of a servo assembly comprising a piston 13d in a cylinder, the displacement of the piston in one direction within the cylinder causing an increase in pump delivery and in the other direction a reduction in delivery.

The displacement of the piston 13d is under the hydraulic control of a servo valve assembly 21 which comprises a valve body 22 having valve ports 23, 24, 25, 26, 27 therein and valve spindle 28 slidable endwise against a return spring 29. The spindle supports valve pistons 28a, 28b, 28c, 28d at spaced positions therealong to control admission of hydraulic fluid (in this case, fuel) through the ports. A duct 30 connects the port 25 with fuel in conduit 16 at pump delivery pressure. Ducts 31, 32 connect parts 24, 26 respectively to apply hydraulic fuel pressure on opposite sides of the piston 13d whilst branched duct 33 connects ports 23 and 27 with low pressure fuel in tank 11.

In its position shown, the servo valve spindle 28 is in its null position with the valve pistons 28b and 28c closing ports 24 and 26 respectively from communication with high pressure fuel applied to the valve at port 25. The servo piston 13d is thus maintained in a fixed position and the swash plate 13c is held at a selected obliquity to give a certain pump delivery. It will be understood that endwise displacement of the servo valve spindle 28 will cause the high pressure fuel to be communicated, through the valve, to one side of the servo piston 13d according to the direction of such endwise movement while simultaneously putting the other side of the piston 13d in communication with low pressure fuel, so allowing the piston to move within its cylinder and thus to vary the stroke of the pump 13.

The movement of the servo valve spindle 28 is under the control of electro-mechanical relays 40 and 50 which are responsive to engine rotational speed and engine temperature respectively.

The relays 40 and 50 are of similar construction and of a known quick-responsive type. In one example, each relay has four pole pieces extending inwardly from the four corners of a rectangle. These pole pieces are shared by two electromagnets, for actuation, at opposite sides of the rectangle and two permanent magnets, for excitation, at two intervening sides of the rectangle, the permanent magnets being disposed with the like pole pieces adjacent one another so as to produce unlike polarity of diagonally opposite pole pieces, one adjacent pair (of opposite polarity) of the four pole pieces being presented at one end and the other opposite pair (also of opposite polarity) being presented at opposite ends of a soft iron armature which is pivoted intermediate its ends centrally of the rectangle for angular movement under the influence of a spring.

Thus, the rotational position of the relay armature will depend upon the value of the current flowing in the two electro magnets. Movement of the armatures of each of the relays is transmitted to the spindle 28 mechanically by means of arms 41 and 51 which are arranged to rotate with respective relay armatures, and bear freely at their free ends on a flange 28e formed on the valve spindle 28.

The relay 40 controls the fuel supply to the engine to maintain a desired engine speed. Current for the relay is generated by a tachogenerator 42 driven by the engine (as indicated schematically at 43) at a speed proportional to engine rotational speed and produces an electrical voltage output N proportional to engine speed. This output is applied to the field coils 44 of the relay 40 through a potentiometer 45, variation of potentiometer resistance effecting a change in the P.D. across the relay field coils and a consequential change in current flowing therethrough. If the value of the current flowing in the relay which results in the relay armature taking up a position consistent with a null position of the servo valve spindle 28 is equal to $I_0$, and such a current is actually flowing in the relay, any change in engine speed resulting from a change in voltage generated by the tachogenerator 42 will change the value of current in the relay from $I_0$ to a different value. The armature of the relay 40 will then be moved to new position according to the new value of the current and through the resultant movement of the arm 41 and servo valve spindle 28, the rate of the fuel supply will be altered to change the engine speed in a corrective sense to restore its former value. When a return to the original engine speed has been made the output of the tachogenerator 42 will again be such as to give a current value to $I_0$ in the relay 40 and the relay armature is moved back again to its position consistent with a null position of the servo valve spindle 28. Thus constant speed governing at a specific engine speed is maintained, the specific speed depending upon the setting of the potentiometer 45.

There is a unique position of the armature of the relay 40 (and hence a particular rate of fuel supply and engine speed) according to the current flowing in the relay and the value of this current may be arranged to be varied by controlled variation of the potentiometer 45 to select any required engine speed. The potentiometer is thus calibrated in terms of engine speed so that the different voltages generated by tachogenerator 42 in response to different engine speeds are made, by the particular setting of the potentiometer, to give rise to the same value $I_0$ of the current flowing in the relay 40, and the slider of the potentiometer 45 is connected to the pilot's throttle lever 46.

Engine temperature control is effected in a basically similar manner through the relay 50. The current for this relay is derived from a thermocouple 52 mounted within the engine casing 2 downstream of the turbine 7, or ideally, immediately after the combustion chamber 6. The heating of thermocouple 52 due to its contact with the hot turbine effluent gases gives rise to an E.M.F. and the resultant current is amplified in amplifier 53 and applied across the field coils 54 of relay 50 and a variable resistance 55. In this case, the variable resistance is calibrated in terms of engine temperature such that the current flowing in the relay 50 can be made to equal a given value $I_0$, consistent with a null position of the servo valve spindle 28, whatever the output of the amplifier 53 and hence whatever the engine temperature, by appropriate adjustment of the variable resistance 55. Then, the slider of the variable resistance can be set to any predetermined temperature value and the engine will be governed at that temperature.

In operation, the engine 1 is normally controlled by varying the rate of fuel supply to the engine through the speed relay 40 in response to movement of the throttle lever 46. This control is subject to a limit determined by maximum engine temperature, relay 50 being operative to override the speed relay 40 when the maximum engine temperature as sensed by thermocouple 52 is reached. The value of this maximum is adjustable according to engine operating conditions by variation of the temperature-calibrated resistance 55.

The system so far described in similar to that described in copending British patent application No. 10693/58. It may further include an acceleration control as in said prior application, and the fuel pump output might also be under the influence of other engine variables such as compressor pressure ratio or mass flow to prevent, for example, overheating, compressor surge or overspeeding. All these variables exercise a limiting, maximum or minimum, effect on the engine fuel supply at all settings of the throttle lever 46.

The present invention introduces into the control system a deceleration control for limiting the thermal stress imposed on the engine components due to sudden movements of the throttle lever 46 in a sense to decrease the rate of fuel supply to the engine, which movements have been found to produce the worst thermal shock conditions. To this end, the throttle lever 46 is connected to a device 61 which comprises a damping piston 62 arranged for reciprocatory movement in a fluid-filled cylinder 63, the piston having a piston rod 64 which extends through one end wall of the cylinder and is pivotally connected to the throttle lever 46. The damping piston is a fluid-tight fit in the cylinder but has two separate valve-controlled passages 65, 66, each extending between its opposite faces. The valves 67, 68 controlling the passages are one-way flap valves arranged to operate in opposite senses and each is biased towards a closing position by a spring 69, 70. Thus, a force applied to the piston tending to cause it to move in the cylinder in either direction is initially resisted by the spring controlling one or other of the one-way valves but after the spring bias is overcome, the valve is opened and whilst fluid transfer from one side of the piston to the other occurs, movement of the damping piston is permitted. In addition to the valve-controlled passageways through the piston, a small diameter bleed passage 71 is provided.

The interior of the cylinder 63 is formed with annular 72, 73 shoulders to limit the length of stroke of the damping piston 62, the length of stroke being sufficient to allow full operational movement of the throttle lever 46.

In the end of the cylinder 63 remote from that through which the rod 64 of the damping piston 62 extends, a control piston 74 having a piston rod 75 is mounted coaxially with the damping piston. The stroke of the control piston is limited to a discrete axial length of the cylinder by shoulders 76, 77 formed internally of the cylinder at postitions such as to space apart the nearest distance the two pistons can approach one another. A light helical return spring 78 is arranged between end wall of the cylinder through which the piston rod 75 of the control piston extends and the adjacent face of the control piston.

The piston 74 could be replaced by a diaphragm.

When the throttle lever 46 is subjected to a sudden force applied in a sense to reduce the rate of fuel supply (as indicated by arrow A) the damping piston 62 is initially displaced in the cylinder, building up a pressure against the control piston 74 which moves under this pressure against its light return spring 78 until arrested by abutment with shoulder 76. Thereupon, further movement of the throttle and the damping piston increases further the pressure in the cylinder which is effective to open the spring-controlled valve 67 and so permit transfer of fluid from one side of the damping piston to the other to occur. Thence the throttle lever can be moved over its full operating range. Similarly, valve 68 permits movement of the throttle in the other direction.

Movement of the control piston 74 is transmitted to its piston rod 75 which is effective to close a switch 81 in a circuit which includes battery 82, solenoid 83 and solenoid-operated switch 84. The solenoid 83 operates a valve 85 in the servo fluid conduit 32. Thus energisation of the solenoid moves the valve from its open position as shown to a position in which the servo conduit is closed except for a small leakage passage 86. The flow of fluid from the underside of piston 13d back to the fuel tank 11 is thus restricted and a limitation is imposed on the rate at which the fuel supply can be reduced by movement of the throttle lever. The lag imposed on the rate of reduction of the fuel supply is determined by the leakage passage 71 in damping piston 62, the fluid gradually flowing through this passage and allowing the control piston to return under the influence of spring 78 to its non-operative position abutting shoulder 77, whereupon the switch 81 is opened and the solenoid 83 de-energised so that the valve 85 is opened and the restriction in the servo fluid conduit 32 removed. The deceleration control will then be available to respond to further sudden closing movements of the engine throttle lever. The lag imposed on the reduction of fuel supply is such as to restrict thermal shock stresses in the engine components, in particular, the turbine blades, to acceptable limits.

The switch 84 previously referred to is provided to limit the effective operation of the valve 85 to insert a restriction in the servo fluid conduit to those engine operating conditions when thermal shock conditions are likely to be significant. Thus when engine temperature reaches some predetermined value, a signal is emitted by a thermocouple 87 at the turbine inlet, and this signal is amplified by amplifier 88 to energise solenoid 89 and close switch 84. At engine temperatures below the predetermined value, the switch 84 is open and movement of the control piston 74 has no effect on valve 85.

In one alternative form of the invention the control piston 74 may be effective to introduce the required lag into the operation of the relay 40. In another alternative, movement of the piston is transmitted to the valve 85 either directly or through a hydraulic transmission.

The fuel pump might be of the fixed delivery type and the fuel supply to the engine varied by means of a spill valve on the delivery side of the pump, this valve being controlled by a servo piston and servo valve as described above. Alternatively, the fuel injectors could be of the spill type, the servo-piston controlling the spill.

It will be noted that the limit on the rate of reduction of the fuel supply is applied only in response to operation of the engine throttle lever, thereby leaving the other controls, e.g. the temperature and acceleration controls referred to, free to vary the fuel supply as quickly as possible without being subjected to any lag.

Figure 2:
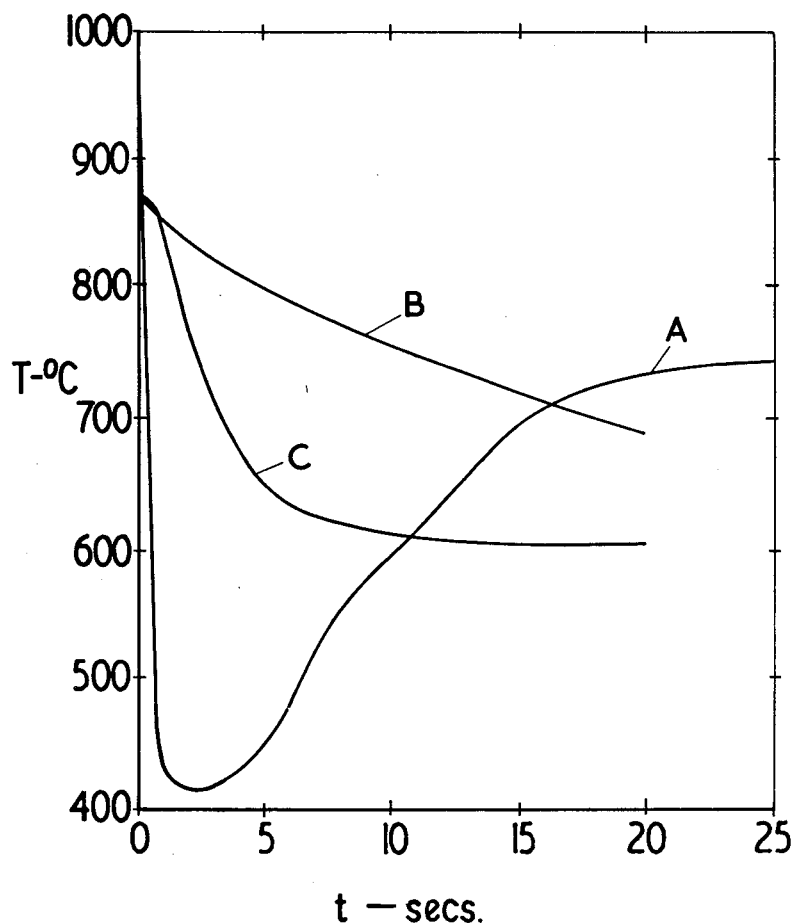
FIGURE 2 is a graph showing the temperature variations with time consequent upon a sudden reduction of fuel supply.
Figure 3:
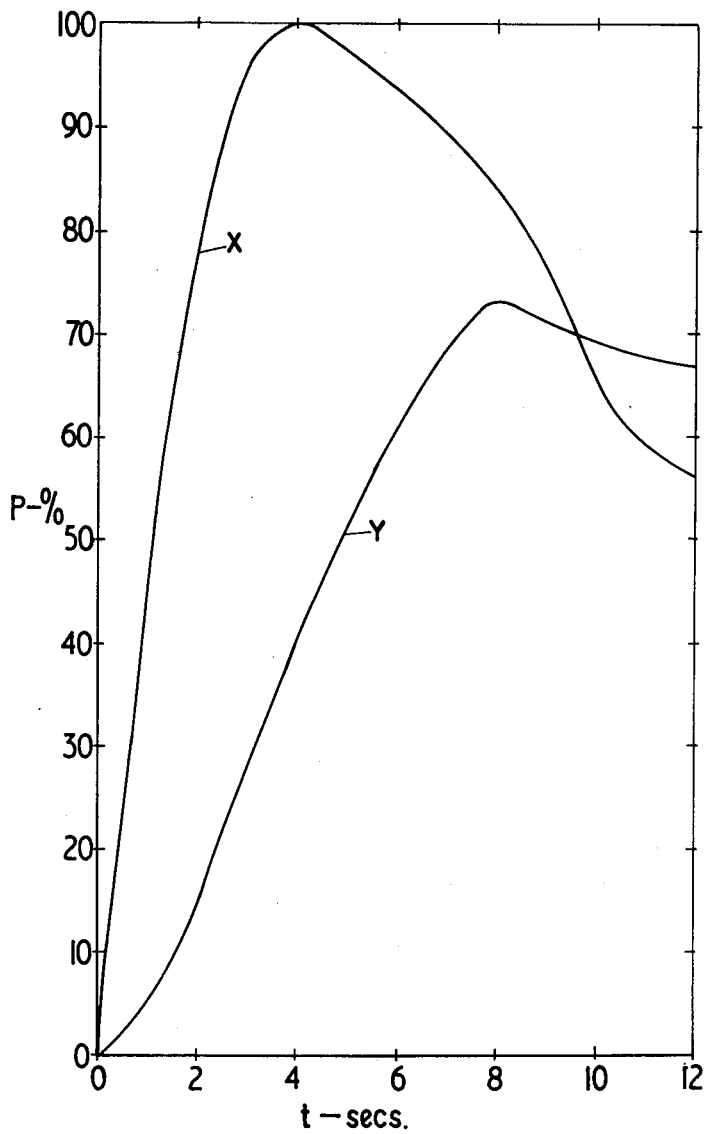
FIGURE 3 is a graph showing the thermal stresses set up on reduction of fuel supply.

The amount of lag required will of course vary from engine to engine. The components most liable to thermal shock are the turbine blades, and it may be assumed that the maximum thermal stress depends on the temperature difference existing between the centre of the blade and its thinnest section, at which positions the response to a change in gas temperature will be respectively slowest and quickest. The variation of temperature T (measured in °C.) with time $t$ (measured in seconds) under the most arduous conditions contemplated, that is, on a sudden decrease of the fuel flow from full speed to idling, in one particular engine is shown in FIGURE 2, the curves A, B, and C representing the gas temperature, the temperature of the centre of the blade and the temperature of the blade trailing edge respectively. FIGURE 3 shows how the percentage thermal stress P varies with time $t$, curve X representing the stress with no lag in the reduction of the fuel supply in response to throttle movement, and curve Y the stress with a lag of 5 seconds. It will be seen that the maximum stress in the latter case is reduced by 25% compared with the former. Such a reduction in stress can be achieved with only a moderate loss in rate of thrust response and vary little loss in aircraft speed response. In the engine referred to it has been observed that on sudden closure of the engine throttle, the fuel supply rate becomes constant after only 2 seconds while the aircraft speed is still changing after 200 seconds. Hence a lag of 5 second in the change of fuel supply can be accepted.

I claim:

1. An engine control system comprising a control member operable to vary the rate of fuel supply to the engine and a deceleration control associated with the control member and operable in response to a sudden movement of the control member in a sense to reduce the rate of fuel supply to impose a limit on the rate of reduction of fuel supply such as will maintain thermal shock stresses in the engine components within acceptable limits, wherein the deceleration control comprises a fluid-filled cylinder, a damping piston therein connected to the control member, said piston having therethrough at least one passage provided with resiliently loaded valve means for permitting flow of fluid in either direction and a further leakage passage, and a control piston in the cylinder, said control piston being movable against a resilient load by sudden movement of the damping piston in response to a movement of the control member in a sense to decrease the rate of fuel supply, said movement of the control piston imposing said limit on the rate of reduction of fuel supply.

2. An engine control system comprising a control member operable to vary the rate of fuel supply to the engine, a deceleration control associated with the control member including limiting means responsive to a rate of movement of the control member sufficient to schedule a reduced rate of fuel flow which would normally produce damaging thermal shock stresses in engine components to impose a limit upon the rate of reduction of fuel supply such as will maintain thermal shock stresses in the engine components within acceptable limits.

References Cited in the file of this patent
UNITED STATES PATENTS

| | | |
|---|---|---|
| 2,450,535 | Watson et al. | Oct. 5, 1948 |
| 2,575,229 | Moore | Nov. 13, 1951 |
| 2,588,522 | Harris | Mar. 11, 1952 |
| 2,670,599 | Davies | Mar. 2, 1954 |
| 2,683,485 | Harris | July 13, 1954 |
| 2,747,366 | Barnes et al. | May 29, 1956 |
| 2,790,303 | Kutzler | Apr. 30, 1957 |
| 2,956,576 | McKeggie | Oct. 18, 1960 |
| 3,007,514 | Werts | Nov. 7, 1961 |

FOREIGN PATENTS

| | | |
|---|---|---|
| 215,698 | Australia | Nov. 14, 1957 |
| 585,032 | Great Britain | Jan. 29, 1947 |